United States Patent [19]

Toplicescu

[11] Patent Number: 4,460,323

[45] Date of Patent: Jul. 17, 1984

[54] PRESS FOR SYNTHETIC DIAMONDS

[76] Inventor: Ioan Toplicescu, 2/21 Kidman St., Coogee, New South Wales, 2034, Australia

[21] Appl. No.: 492,267

[22] Filed: May 6, 1983

[51] Int. Cl.³ .............................................. B30B 11/32
[52] U.S. Cl. ..................................... 425/77; 425/406; 249/160
[58] Field of Search ................... 425/77, 78, 406, 412, 425/415; 249/160

[56] References Cited

U.S. PATENT DOCUMENTS

| | | | |
|---|---|---|---|
| 2,298,885 | 10/1942 | Hull | 425/78 X |
| 3,034,178 | 5/1962 | Cartier et al. | 425/78 X |
| 3,238,281 | 3/1966 | Kato | 425/412 X |
| 3,245,118 | 4/1966 | Smith | 425/77 |
| 3,379,043 | 4/1968 | Fuchs | 425/77 X |
| 3,452,395 | 7/1969 | Grieger | 425/78 |
| 3,757,410 | 9/1973 | Roberts | 425/78 X |
| 3,807,913 | 4/1974 | Brede et al. | 425/78 |
| 3,904,337 | 9/1975 | Mercier | 425/412 X |
| 3,972,662 | 8/1976 | Bird | 425/78 |
| 4,012,215 | 3/1977 | Schwab et al. | 425/406 X |
| 4,209,289 | 6/1980 | Newcomb et al. | 425/412 X |

*Primary Examiner*—J. Howard Flint, Jr.
*Attorney, Agent, or Firm*—Sandler & Greenblum

[57] ABSTRACT

A press to be used in the synthesis of diamonds, the press has a cavity which receives a movable press member, with both the cavity and press having co-operating inclined surfaces which co-operate to define enclosed cavities to receive a base material from which diamonds are manufactured.

5 Claims, 11 Drawing Figures

PRESS FOR SYNTHETIC DIAMONDS

The present invention relates to presses and more particularly but not exclusively to presses used in the synthesis of diamonds.

It is a disadvantage of prior known presses which are employed to manufacture diamonds, that considerable forces are employed in addition to a requirement for heat. Due to the magnitude of the forces required, special materials need to be employed and high temperatures are also necessary to the limitation of the maximum forces which may be employed due to the materials used. It has been generally known to use metal alloys which are coated with materials to reduce friction within the press.

It is an object of the present invention to overcome or substantially ameliorate the above disadvantages.

There is disclosed herein a press comprising; a body having a cavity with parallel sides extending from an opening on an external surface of the body; each of at least two of said sides has extending from it and into said cavity an inclined body surface facing said opening; a movable press member slidably received within said cavity so as to be guided by said sides in movement within said cavity; at least two inclined press surfaces extending transversely outwardly from said movable press member and axially aligned with said body surfaces so as to co-operate therewith in conjunction with said sides and said movable press member to define at least two enclosed cavities to receive material to be compressed by said press; and wherein said cavities are equally angularly arranged about the longitudinal axis of said cavity and movable press member so that forces within said press are balanced.

A preferred form of the present invention will now be described by way of example with reference to the accompanying drawings, wherein.

Figure 1:
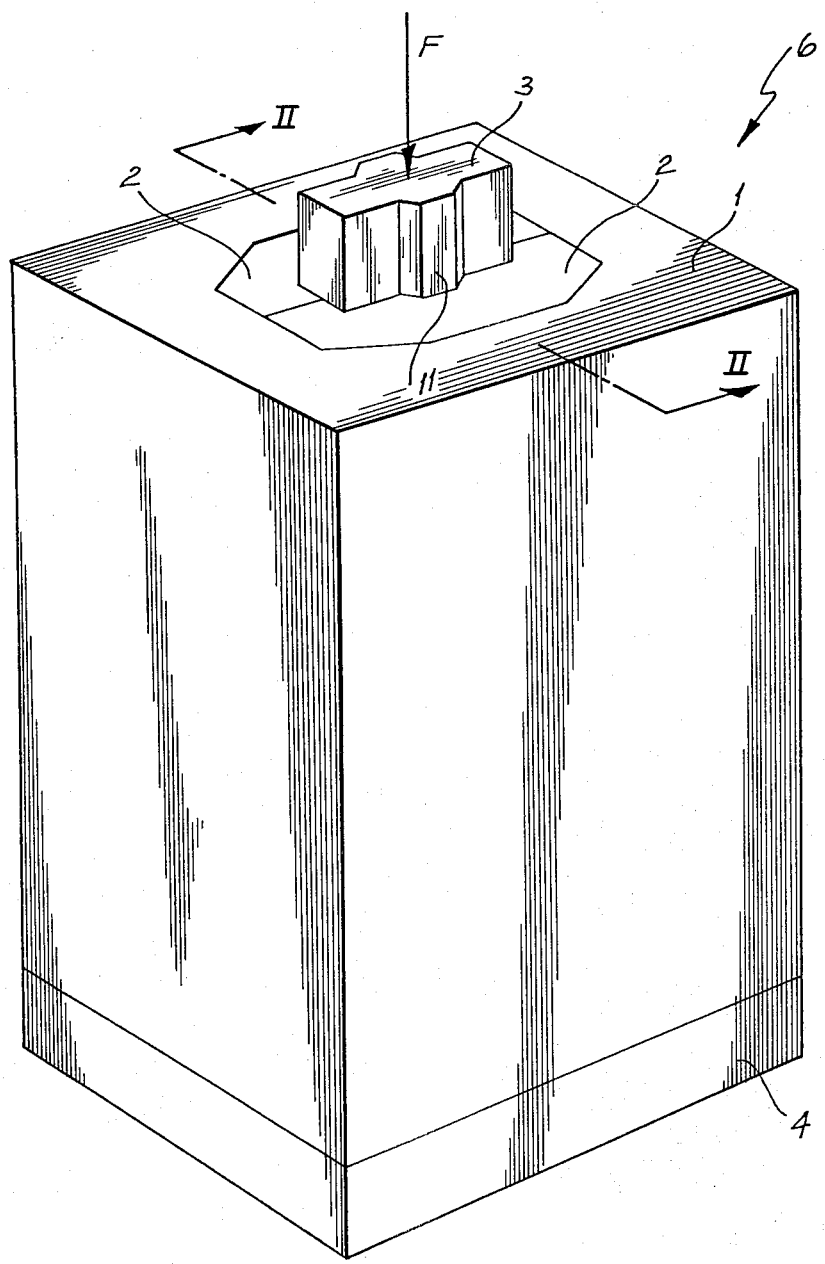
FIG. 1 is a schematic perspective view of a press to aid in the manufacture of diamonds.
Figures 2, 3:
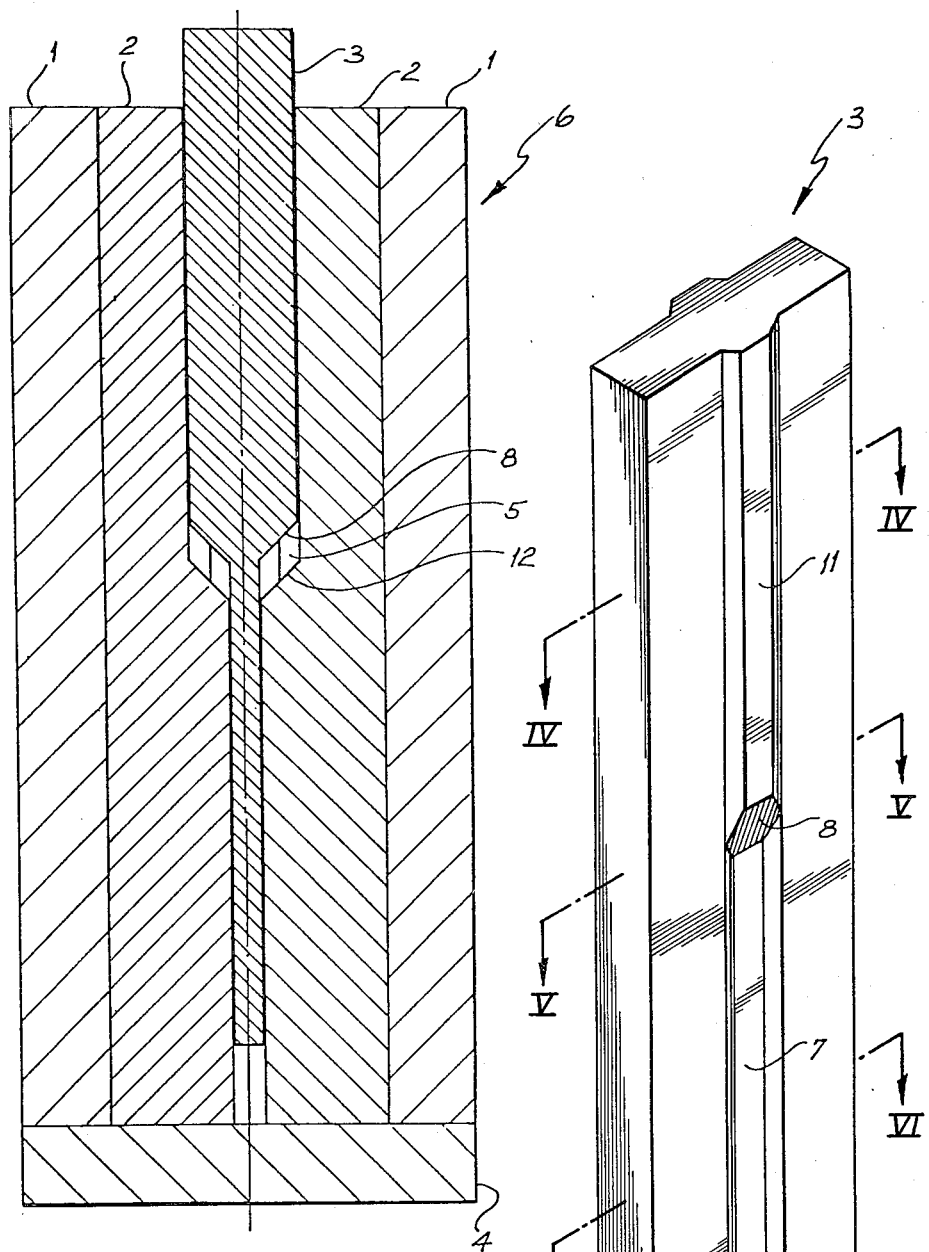
FIG. 2 is a schematic sectioned side elevation of the press of FIG. 1 sectioned along the line II—II.
FIG. 3 is a schematic perspective view of a movable press member employed in the press of FIG. 1.
Figure 4:
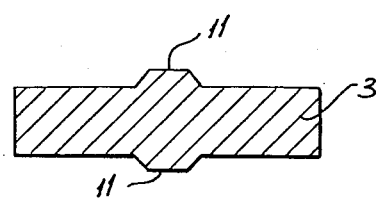
FIG. 4 is a schematic top plan view of the movable press member of FIG. 3 sectioned along the line IV—IV.
Figure 5:
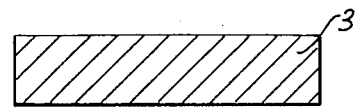
FIG. 5 is a schematic sectioned plan view of the movable press member of FIG. 2, sectioned along the line V—V.
Figure 6:
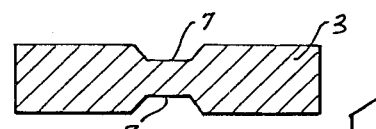
FIG. 6 is a schematic sectioned plan view of the movable press member, sectioned along the line VI—VI.
Figure 7:
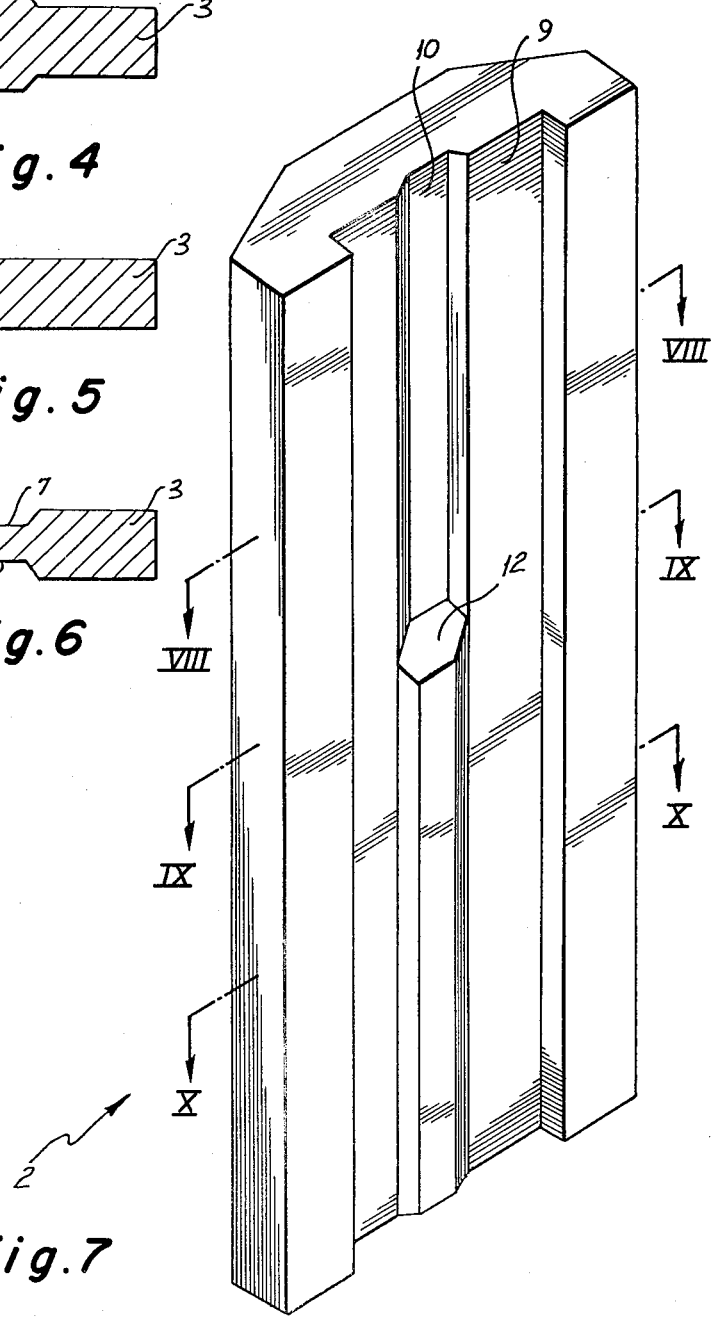
FIG. 7 is a schematic perspective view of a fixed die member to be employed in the press of FIG. 1.
Figure 11:
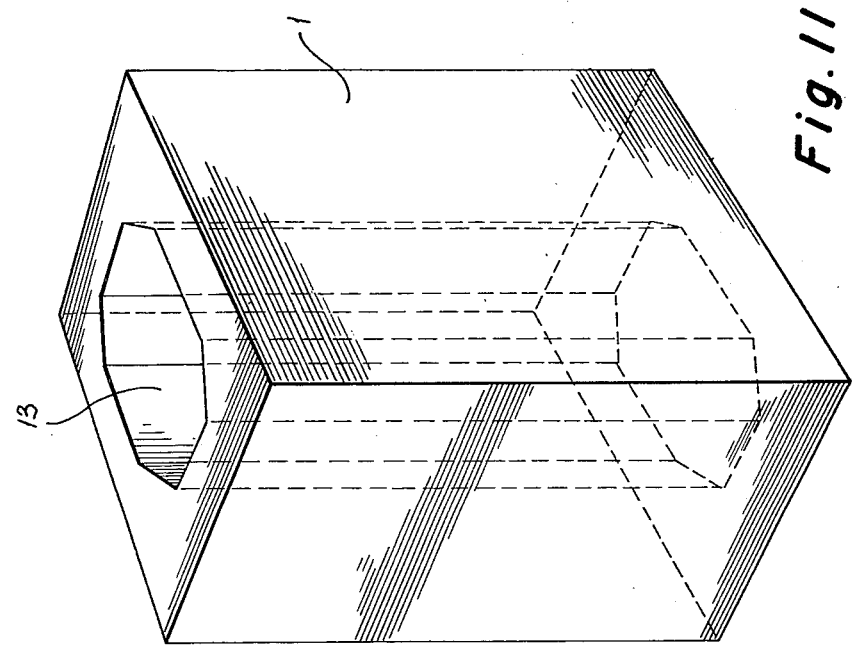
FIG. 11 is a schematic perspective view of the body of the press of FIG. 1.
Figure 8:
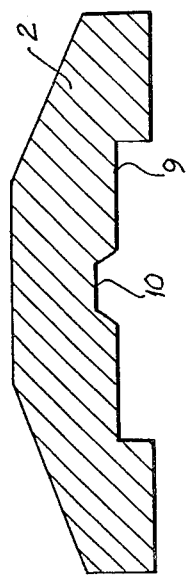
FIG. 8 is a schematic plan view of the fixed die member of FIG. 7 sectioned along the line VIII—VIII.
Figure 9:
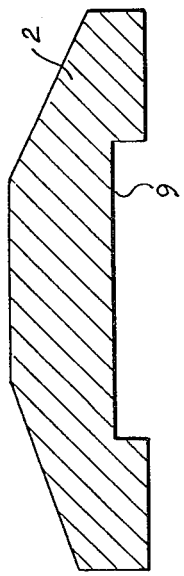
FIG. 9 is a schematic plan view of the fixed die member of FIG. 7, sectioned along the line IX—IX.
Figure 10:
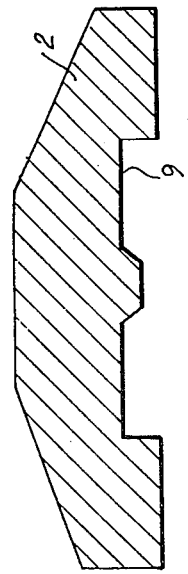
FIG. 10 is a schematic sectioned plan view of the fixed die member of FIG. 7, sectioned along the line X—X.

In FIG. 1 there is schematically depicted a press 6 having a body 1 which receives two cooperating fixed press members 2 which receive a movable press member 3. As can be seen from FIGS. 2 to 6, the movable press member 3 includes two longitudinal recesses 7 which are on opposite sides of the movable press member 3 with each recess terminating in an inclined surface 8 which partly defines a cavity 5. The two surfaces 8 are inclined by the same angle and define planes which intersect at the central longitudinal axis of the member 3.

Located within the body 1 are two fixed die members 2 which body 1 is shaped so as to define a longitudinal extending passage 9 and which is a complementary shape to the movable die member 3. However, the fixed die members 2 are provided with recesses 10 which cooperate to receive longitudinal ridges 11 of the movable die members 3. Each of the recesses 10 terminate in an inclined surface 12 which is inclined to the longitudinal axis of the press 6 at the same angle as the inclined surfaces 8. The surfaces 8 and 12 cooperate to define the cavity 5 in combination with the internal surfaces of the cavities 7 and 10.

It should be appreciated that by having a cavity 5 located at each side of the movable press member 3, frictional forces are reduced thereby minimising the loss of force being applied to the base material located in the cavity 5. Additionally, by the surfaces 8 and 12 being inclined, the force being applied to the base material located in the cavity 5 is increased while the force is applied at such an angle to minimise shearing of the material along a shear plane extending at an angle to the direction of the force F being applied to the movable die member 3.

The two fixed die members 2 are located within a passage 13 which is of a complementary shape to the combined configuration of the two abutting fixed die members 2. The body 1 is mounted on the base plate 4.

It should be appreciated that since the surfaces 8 and 12 are symmetrical about the central longitudinal axis of the member 3, the forces are balanced within the press 6.

The above-described preferred embodiment of the present invention has the following advantages:
(i) the volume of the cavity 5 is larger than in conventional presses;
(ii) the material being subjected to the compressive force is subjected to higher compressive forces in comparison to previous devices as the compressive force is being transmitted firstly via a shear force in the movable press member 3 and then to a compressive force applied directly to the material in the cavity 5.

What I claim is:
1. A press comprising; a body having a cavity with parallel sides extending from an opening on an external surface of the body; each of at least two of said sides has extending from it and into said cavity an inclined body surface facing said opening; a movable press member slidably received within said cavity so as to be guided by said sides in movement within said cavity; at least two inclined press surfaces extending transversely outwardly from said movable press member and axially aligned with said body surfaces so as to co-operate therewith in conjunction with said sides and said movable press member to define at least two enclosed cavities to receive material to be compressed by said press; and wherein said cavities are equally angularly arranged about the longitudinal axis of said cavity and movable press member so that forces within said press are balanced.

2. The press of claim 1 wherein said body surfaces extend from said sides by an acute angle, and said press surfaces also extend from said movable press member by said acute angle.

3. The press of claim 1 or 2 wherein there are two of said body surfaces and two of said press surfaces so as to define two of said cavities.

4. The press of claim 1 or 2 wherein the external periphery of said movable press member and/or said sides are coated with a material to minimise frictional forces developed between said sides and movable die member.

5. The press of claim 3 wherein said acute angle is approximately 45°.

* * * * *